(12) United States Patent
Kuo et al.

(10) Patent No.: US 9,841,849 B2
(45) Date of Patent: Dec. 12, 2017

(54) CARRIER SIGNAL DETECTION APPARATUS, TOUCH CONTROL DETECTION APPARATUS AND DETECTION METHODS THEREOF

(71) Applicant: Novatek Microelectronics Corp., Hsinchu (TW)

(72) Inventors: Hung-Cheng Kuo, Hsinchu (TW); Tsen-Wei Chang, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 202 days.

(21) Appl. No.: 14/141,452

(22) Filed: Dec. 27, 2013

(65) Prior Publication Data
US 2015/0130744 A1   May 14, 2015

(30) Foreign Application Priority Data

Nov. 12, 2013   (TW) .............................. 102141081 A

(51) Int. Cl.
*G06F 3/044* (2006.01)
*G09G 5/18* (2006.01)
*G06F 3/041* (2006.01)

(52) U.S. Cl.
CPC ............ *G06F 3/044* (2013.01); *G06F 3/0416* (2013.01); *G09G 5/18* (2013.01)

(58) Field of Classification Search
CPC ........ G06F 3/044; G06F 3/045; G06F 3/0412; G06F 3/041; G09G 5/18
USPC ......................................................... 345/174
See application file for complete search history.

(56) References Cited

U.S. PATENT DOCUMENTS

| 5,701,124 | A | 12/1997 | Ichimura et al. |
| 8,576,189 | B1 * | 11/2013 | Maharyta ................ G06F 3/044 |
| | | | 345/173 |
| 2005/0018765 | A1 | 1/2005 | Endres et al. |
| 2005/0080831 | A1 * | 4/2005 | Pickerd et al. ............... 708/300 |
| 2013/0063396 | A1 * | 3/2013 | Kim et al. ..................... 345/174 |
| 2014/0125625 | A1 * | 5/2014 | Su .......................... G06F 3/044 |
| | | | 345/174 |

(Continued)

FOREIGN PATENT DOCUMENTS

| CN | 1835395 | 9/2006 |
| CN | 101197801 | 6/2008 |

(Continued)

OTHER PUBLICATIONS

Johns et al., "Design and Analysis of Delta-Sigma Based IIR Filters", Circuits and Systems II: Analog and Digital Signal Processing, IEEE Transactions, Apr. 1993, pp. 233-240.

(Continued)

*Primary Examiner* — Towfiq Elahi
(74) *Attorney, Agent, or Firm* — JCIPRNET

(57) ABSTRACT

A carrier signal detection apparatus, a touch control apparatus and detection methods thereof are provided. The carrier signal detection apparatus includes an analog to digital converting (ADC) apparatus and a filter. The ADC apparatus receives an analog input signal and converts the analog input signal to a digital signal. The filter receives the digital signal and accumulates the digital signal according to a delay time for generating a carrier signal detection result.

14 Claims, 5 Drawing Sheets

(56) References Cited

U.S. PATENT DOCUMENTS

2014/0176493 A1* 6/2014 Ahn .................. G06F 3/044
                                                    345/174
2014/0240256 A1* 8/2014 Kim .................. G06F 3/0416
                                                    345/173

FOREIGN PATENT DOCUMENTS

CN          101373971       2/2009
CN          102195680       9/2011

OTHER PUBLICATIONS

Lai et al., "Time-Domain Analog-to-Digital Converters with Domino Delay Lines", VLSI Design, Automaton, and Test (VLSI-DAT), 2013 International Symposium, Apr. 22-24, 2013, pp. 1-4.
Kang-Chun Peng, "Field-Programmable Gate-Array Design of Fractional-N Frequency Synthesizer for Wireless Communications", Master's Thesis, Department of Mechanical and Electromechanical Engineering, National Sun Yat-sen University, Jun. 2000, pp. 1-5.
Lee et al., "A Sigma-Delta Modulation Based BIST Scheme for A/D Converters", Test Symposium, 2003. ATS 2003. 12th Asian, Nov. 16-19, 2003, pp. 124-127.
"Office Action of Taiwan Counterpart Application", dated Oct. 19, 2015, p. 1-p. 8.
"First Office Action of China Counterpart Application", dated Feb. 3, 2017, p. 1-p. 11.

* cited by examiner

CARRIER SIGNAL DETECTION APPARATUS, TOUCH CONTROL DETECTION APPARATUS AND DETECTION METHODS THEREOF

CROSS-REFERENCE TO RELATED APPLICATION

This application claims the priority benefit of Taiwan application serial no. 102141081, filed on Nov. 12, 2013. The entirety of the above-mentioned patent application is hereby incorporated by reference herein and made a part of this specification.

BACKGROUND OF THE INVENTION

Field of the Invention

The invention relates to a carrier signal detection apparatus and a detection method thereof, and more particularly to a touch control detection apparatus using carrier signal detection and a detection method thereof.

Description of Related Art

In conventional technical field, a delta-sigma analog to digital converting (ADC) device includes a digital part and an analog part, wherein the digital part is composed of a plurality of digital filters. In general, these digital filters include a downsampling decimation filter reducing a data rate and a digital filter for obtaining a final output signal.

The purpose of the downsampling decimation filter is merely to reduce the data rate, so as to facilitate signal processing by a digital filter later. On the other hand, the digital filter is always the part that has the most complicated circuit in the delta-sigma ADC device, and is also the part in the delta-sigma ADC device that requires the most power consumption. Therefore, it is an issue worthy of particular attention for designers in the field to reduce circuit complexity and power consumption in this part.

SUMMARY OF THE INVENTION

A carrier signal detection apparatus and detection method are provided, capable of simplifying circuit structure and reducing hardware cost.

A carrier signal detection apparatus and detection method are further provided, capable of simplifying hardware circuit in a carrier signal detection part for cost reduction.

The carrier signal detection apparatus includes an ADC apparatus and a filter. The ADC apparatus receives an analog input signal and converts the analog input signal to a digital signal. The filter is coupled to the ADC apparatus. The filter receives the digital signal and accumulates the digital signal according to a delay time for generating a carrier signal detection result.

In an embodiment, the filter includes an adder and a delay unit. The adder is coupled to the ADC apparatus to receive the digital signal. The adder adds the digital signal and a delayed carrier signal detection result to obtain the carrier signal detection result. The delay unit is coupled to the adder and delays the carrier signal detection result to generate the delayed carrier signal detection result.

In an embodiment, the digital signal is a single-bit signal.

In an embodiment, the filter includes a multiplier, an adder and a delay unit. The multiplier is coupled to the ADC apparatus to receive the digital signal and a filtering parameter, and multiplies the digital signal by the filtering parameter. The adder is coupled to the multiplier and adds the output from the multiplier and a delayed carrier signal detection result to obtain the carrier signal detection result. The delay unit is coupled to the adder and delays the carrier signal detection result to generate the delayed carrier signal detection result.

In an embodiment, the digital signal is a multi-bit signal.

In an embodiment, the carrier signal detection apparatus further includes at least one decimator. The decimator is serially connected between the ADC apparatus and the filter to perform downsampling decimation on the digital signal.

The touch control detection apparatus includes at least one touch control detection channel and a carrier signal detection apparatus. The touch control detection channel receives a carrier signal and generates a response carrier signal according to the touched state. The carrier signal detection apparatus includes an ADC apparatus and a filter. The ADC apparatus receives a response carrier signal and converts the response carrier signal to a digital signal. The filter is coupled to the ADC apparatus. The filter receives the digital signal and accumulates the digital signal according to a delay time for generating a carrier signal detection result.

The carrier signal detection method includes the following steps: providing an ADC apparatus to receive an analog input signal and convert the analog input signal to a digital signal; providing a filter to receive the digital signal; and providing the filter to accumulate the digital signal according to a delay time for generating a carrier signal detection result.

The touch control detection method includes the following steps: providing at least one touch control detection channel to receive a carrier signal and generate a response carrier signal according to the touched state via the touch control detection channel; providing an ADC apparatus to receive the response carrier signal and convert the response carrier signal to a digital signal; providing a filter to receive the digital signal; and providing the filter to accumulate the digital signal according to a delay time for generating a carrier signal detection result.

Based on the above, the invention provides the filter to simply accumulate the digital signal generated by the ADC apparatus to obtain a feature value in the carrier signal, so as to know the variation in the carrier signal via the obtained feature value. Thereby, the filter merely requires a simple accumulator circuit rather than a precise and complex filter circuit, which effectively reduces circuit complexity and hardware cost and enhances the overall efficiency of the system.

To make the above features and advantages of the invention more comprehensible, several embodiments accompanied by drawings are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
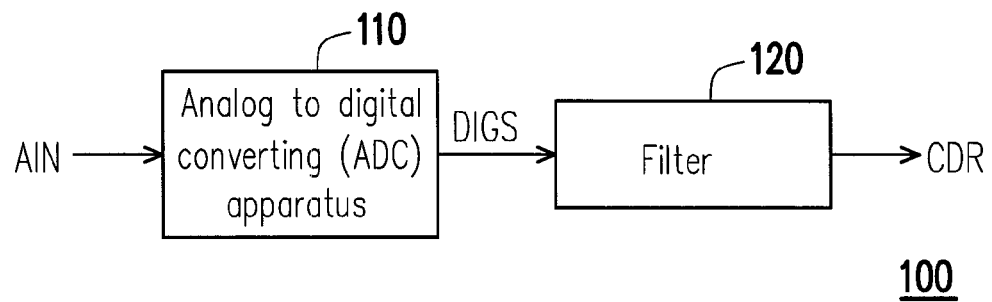
FIG. 1 illustrates a schematic diagram of a carrier signal detection apparatus 100 according to an embodiment.

Referring to FIG. 1, FIG. 1 illustrates a schematic diagram of a carrier signal detection apparatus 100 according to an embodiment. The carrier signal detection apparatus 100 is implemented according to a structure of a delta-sigma ADC device. The carrier signal detection apparatus 100 includes an ADC apparatus 110 and a filter 120. The ADC apparatus 110 receives an analog input signal AIN, and the ADC apparatus 110 performs an ADC operation on the analog input signal AIN to generate a digital signal DIGS. The analog input signal AIN is a carrier signal, and may be expressed as, for example, b(t)*sin(wt), wherein b(t) is an amplitude of the analog input signal AIN along a time (t) change, while wt represents a frequency of the analog input signal AIN.

The filter 120 is coupled to the ADC apparatus 110 and receives the digital signal DIGS generated by the ADC apparatus 110. It is worth noting that the filter 120 in the present embodiment accumulates the digital signal DIGS according to a delay time, and generates a carrier signal detection result CDR via the accumulative result. In other words, the filter 120 in the embodiment differs from a filter in a conventional delta-sigma ADC device. The filter 120 merely requires decimating the digital signal DIGS according to a fixed cycle and accumulating the decimation result to generate the carrier signal detection result CDR. The fixed cycle is configured according to the delay time.

Figure 2:
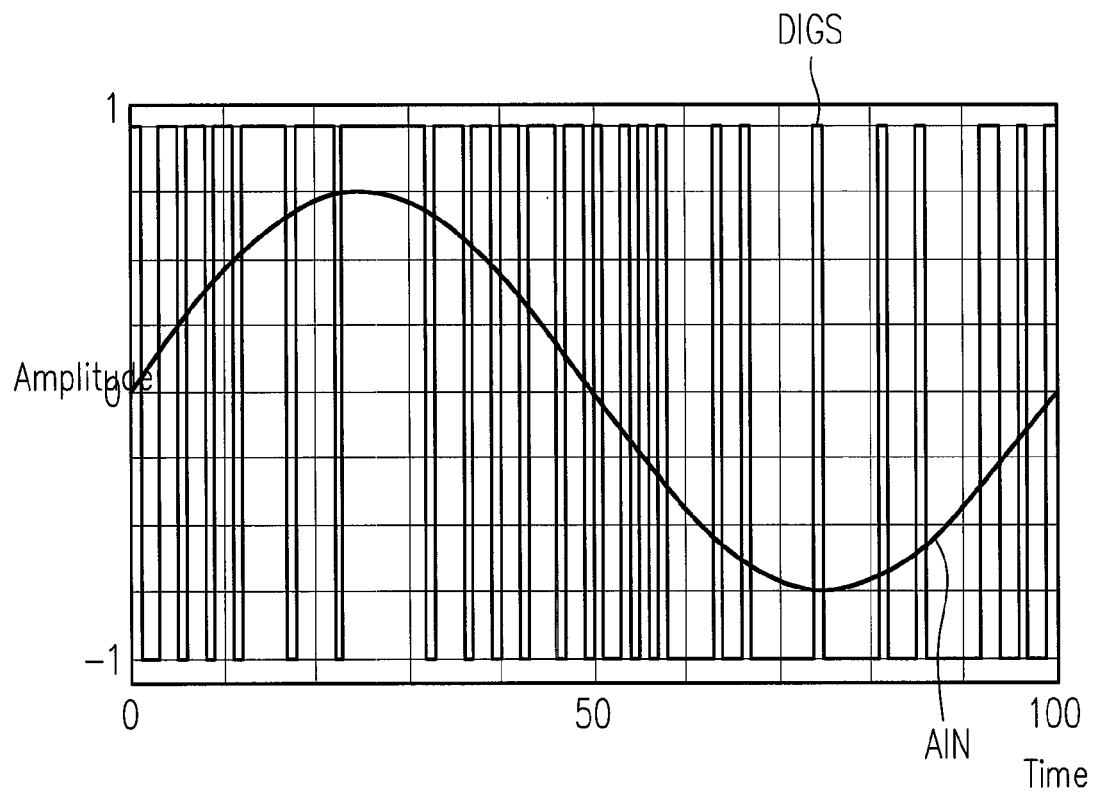
FIG. 2 illustrates a diagram of a relationship between an analog input signal AIN and a digital signal DIGS according to an embodiment.

Referring to both FIGS. 1 and 2, wherein FIG. 2 illustrates a diagram of a relationship between the analog input signal AIN and the digital signal DIGS according to an embodiment. Take an example that the digital signal DIGS converted by the ADC apparatus 110 is a single-bit signal, when the amplitude of the analog input signal AIN is larger than 0, the digital signal DIGS converted correspondingly equals 1. On the other hand, when the amplitude of the analog input signal AIN is smaller than 0, the digital signal DIGS converted correspondingly equals −1. In the present embodiment, the ADC apparatus 110 may be a delta-sigma ADC apparatus, wherein the ADC apparatus 110 generates a feedback signal from the converted result via an ADC operation, operates a subtracting operation on the feedback signal and the analog input signal AIN, filters the result of subtraction (or not perform the filtration), and performs an operation of analog to digital conversion on the result of filtration to generate a digital signal DIGS.

It is clear from FIG. 2 that when the amplitude of the analog input signal AIN is higher, the time period that the digital signal DIGS converted correspondingly remains equal to 1 is longer; on the other hand, when the amplitude of the analog input signal AIN is lower, the time period that the digital signal DIGS converted correspondingly retains equal to −1 is longer.

Figure 3:
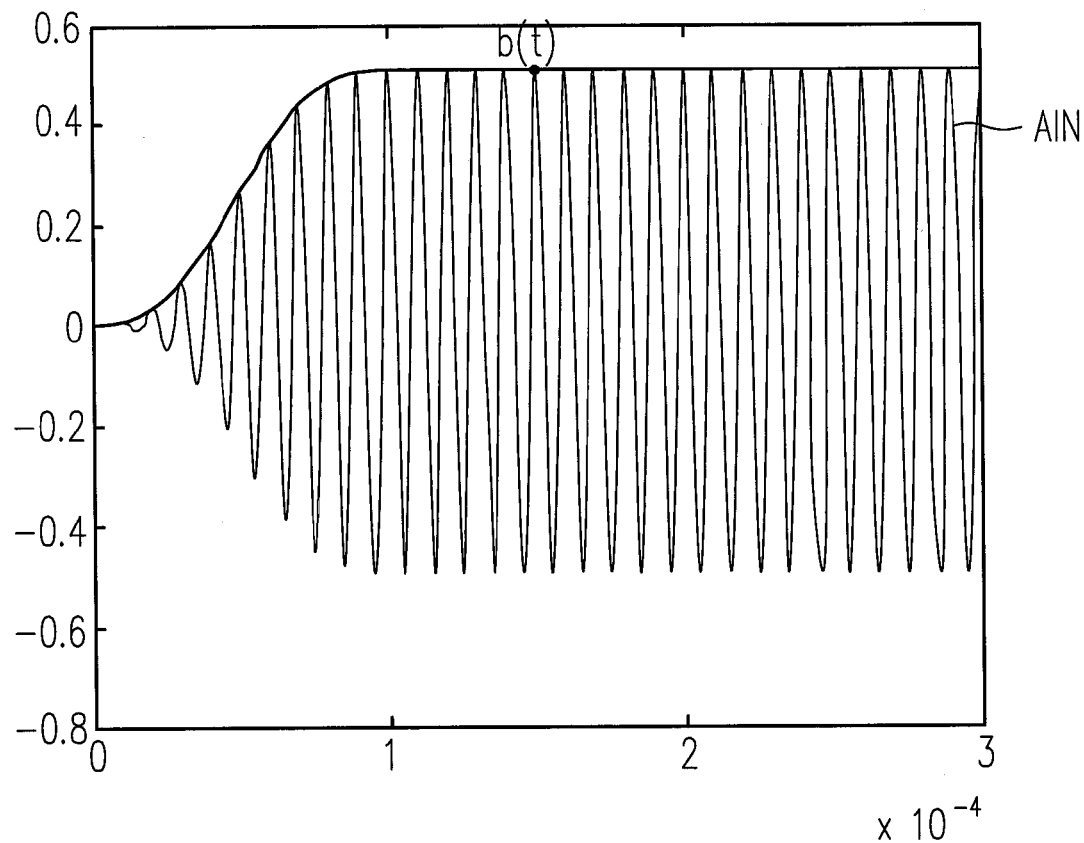
FIG. 3 illustrates a schematic diagram of the analog input signal AIN according to the embodiment.

Referring further to FIGS. 1-3, wherein FIG. 3 illustrates a schematic diagram of the analog input signal AIN according to the embodiment. Via the accumulation by the filter 120, data about the maximum amplitude b(t) of the analog input signal AIN is obtained.

Therefore, it is learned from the illustrations in FIGS. 2 and 3 that via accumulating the digital signal DIGS, the condition about the amplitude variation of the analog input signal AIN is obtained. In other words, via the accumulation by the filter 120, the carrier signal detection result CDR of the analog input signal AIN is obtained without using the complex circuit of a comb filter commonly used in conventional technology, which effectively reduces circuit complexity and power consumption.

In addition, since the filter 120 merely needs to perform accumulation, it is not necessary to construct a decimator for downsampling between the ADC apparatus 110 and the filter 120 of the present embodiment to reduce the frequency of the digital signal DIGS. That is to say, the circuit structure of the carrier signal detection apparatus 100 may be simpler and further reduces the required power consumption. It is further worth noting that via reduction in the arrangement of the decimator for downsampling, the condition of noise interference on signals is effectively reduced. That means, by not constructing the decimator for downsampling, the present embodiment effectively enhances a signal to noise ration (S/N) to maintain the quality of signal.

Figure 4:
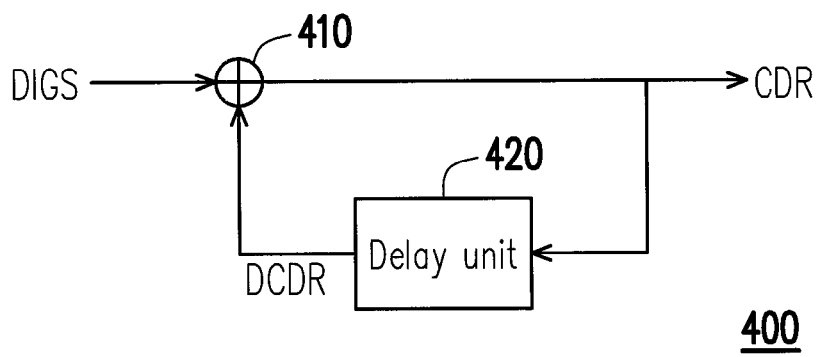
FIG. 4 illustrates a schematic diagram of an example of a filter according to the embodiment.

Below referring to FIG. 4, FIG. 4 illustrates a schematic diagram of an example of a filter according to the embodiment. The filter 400 includes an adder 410 and a delay unit 420. The adder 410 is coupled to the ADC apparatus to receive the digital signal DIGS. In addition, the adder 410 receives a delayed carrier signal detection result DCDR and adds the delayed carrier signal detection result DCDR and the digital signal DIGS. The delay unit 420 is coupled to the adder 410 to receive the carrier signal detection result CDR and delay the carrier signal detection result CDR so as to generate the delayed carrier signal detection result DCDR. Via adding the delayed carrier signal detection result DCDR and the digital signal DIGS by the adder 410, accumulation is performed on the digital signal DIGS for generating the carrier detection result CDR.

In the present embodiment, the digital signal DIGS is, for example, a single-bit signal. For instance, the digital signal DIGS may be +1 or −1.

Figure 5:
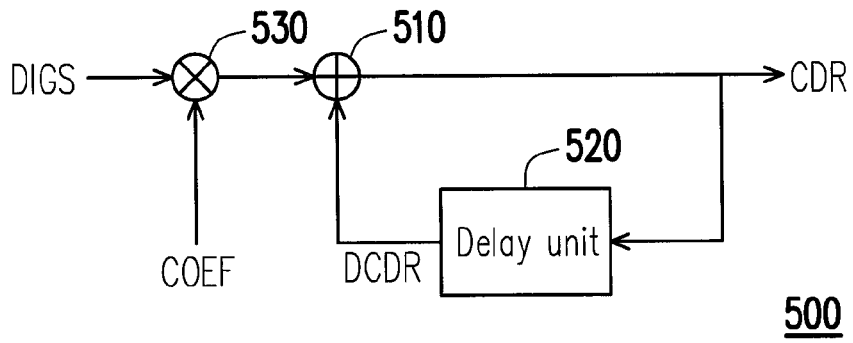
FIG. 5 illustrates a schematic diagram of another example of the filter according to the embodiment.

Referring further to FIG. 5, FIG. 5 illustrates a schematic diagram of another example of a filter according to the embodiment. In FIG. 5, the filter 500 includes an adder 510, a delay unit 520 and a multiplier 530. The multiplier 530 receives the digital signal DIGS and receives a filtering parameter COEF, wherein the digital signal DIGS may be a multi-bit signal. The multiplier 530 multiplies the digital signal DIGS by the filtering parameter COEF, and transmits the product of multiplication to the adder 510.

Herein, the filtering parameter COEF may be arranged according to the band of frequency to be filtered out by the filter 500. In addition, under the combined condition that the filtering parameter COEF may be expressed as a power of 2, the multiplier 530 may simply shift and add the digital signal DIGS to finish the multiplication. More specifically, if the filtering parameter COEF equals $2^{-1}+2^{-2}$, the multiplier 530 merely needs to shift the filtering parameter COEF one unit to the right and two units to the right and add the two shifted numbers to obtain the product of multiplication.

The adder 510 is coupled to the multiplier 530 and the delay unit 520, and the adder 510 also performs an add operation on the output generated by the multiplier 530 and the delay generated by the delay unit 520 for generating the carrier signal detection result CDR.

Figure 6:
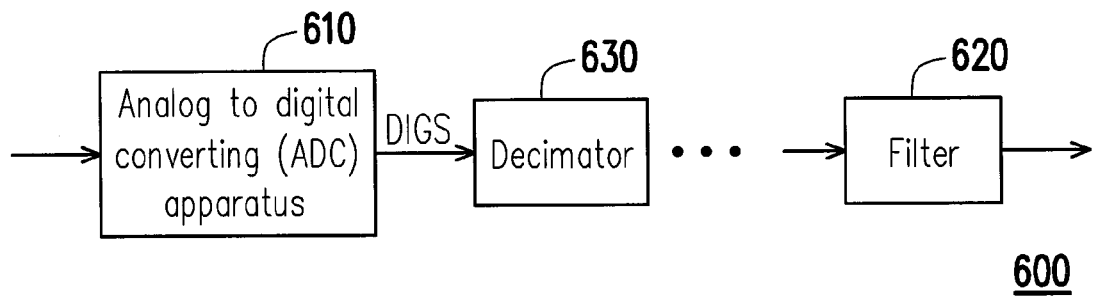
FIG. 6 illustrates a schematic diagram of a carrier signal detection apparatus 600 according to another embodiment.

Below referring to FIG. 6, FIG. 6 illustrates a schematic diagram of a carrier signal detection apparatus 600 according to another embodiment. The carrier signal detection apparatus 600 includes an ADC apparatus 610, a filter 620 and at least one decimator 630. In the present embodiment, the decimator 630 is a downsampling decimator, and the number of the decimator 630 may be one or multiple. In addition, the decimator 630 is serially connected between the ADC apparatus 610 and the filter 620, so as to perform downsampling and decimation on the digital signal DIGS generated by the ADC apparatus 610. By the way, the decimator 630 may also include a low-pass filter.

Figure 7:
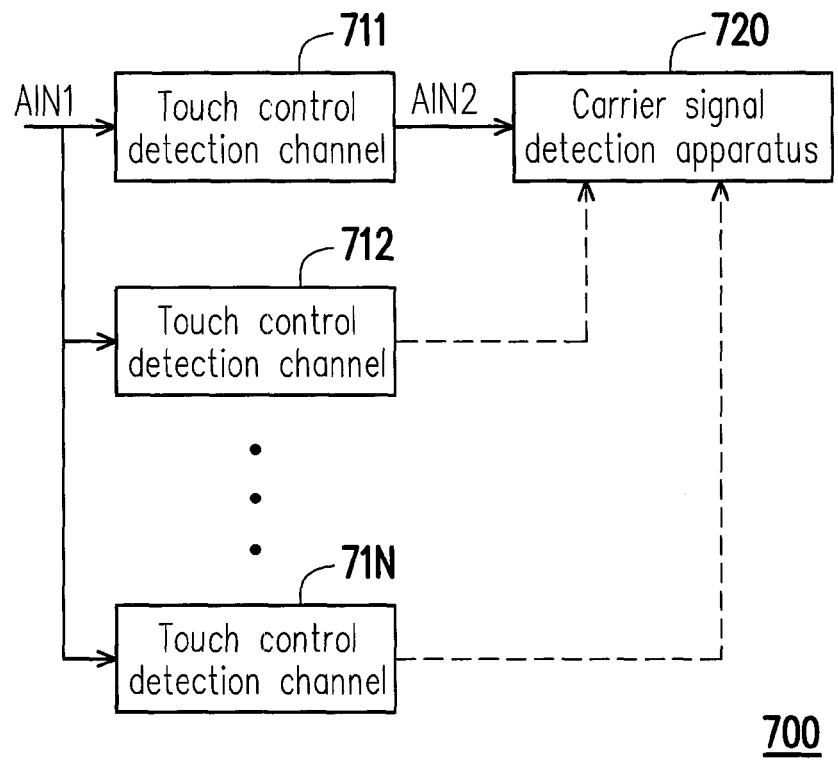
FIG. 7 illustrates a schematic diagram of a touch control detection apparatus 700 according to a third embodiment.

Below referring to FIG. 7, FIG. 7 illustrates a schematic diagram of a touch control detection apparatus 700 according to a third embodiment. The touch control detecting apparatus 700 includes touch control detection channels 711-71N and a carrier signal detection apparatus 720. The carrier signal detection apparatus 720 is coupled to the touch control detection channels 711-71N. When performing touch control detection, a carrier signal AIN1 is transmitted into the touch control detection channels 711-71N in sequence. Take the touch control detection channel 711 as an example, the touch control detection channel 711 receives the carrier signal signal AIN1, and generates a response carrier signal AIN2 according to the touched state received by the touch control detection channel 711. The response carrier signal AIN2 is transmitted to the carrier signal detection apparatus 720, and the state of the response carrier signal AIN2 is obtained via the carrier signal detection performed by the carrier signal detection apparatus 100 or 600 as in the embodiment of FIG. 1 or 6. From the difference between the response carrier signal AIN2 and the carrier signal AIN1, the touched status of the touch control detection channel 711 is reckoned.

In the present embodiment, the carrier signal AIN1 is transmitted into the touch control detection channels 711-71N in sequence, while the touch control detection channels 711-71N transmit the corresponding response carrier signal to the carrier signal detection apparatus 720 in sequence. Thereby, the carrier signal detection apparatus 720 is able to calculate the carrier signal detection result by time division, and obtains the touched state of each of the touch control detection channels 711-71N.

It is for certain that in other embodiments, the touch control detection channels 711-71N may also correspond to different carrier signal detection apparatus, and thereby the touch control detection channels 711-71N are able to detect the touched state simultaneously.

The touch control detection channels 711-71N may be any kind of touch panel that can be detected via carrier signals, such as a capacitive touch control panel.

Figure 8:
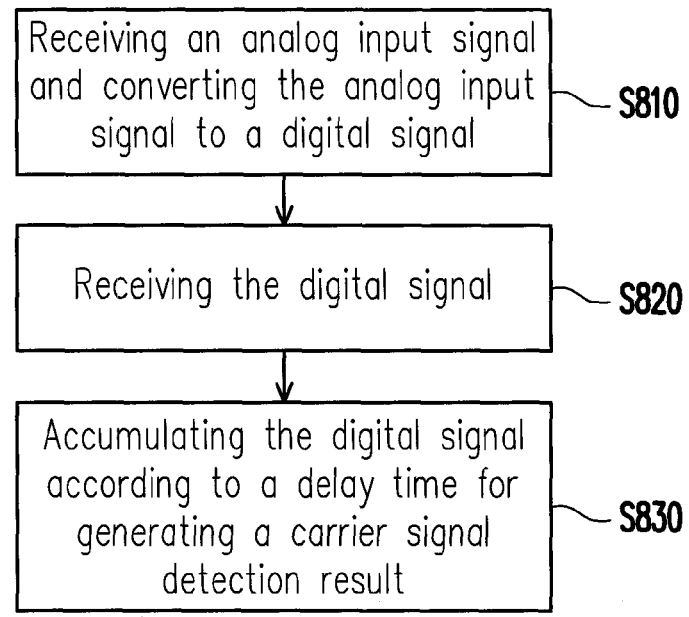
FIG. 8 illustrates a flowchart of a carrier signal detection method according to an embodiment.

Below referring to FIG. 8, FIG. 8 illustrates a flowchart of a carrier signal detection method according to an embodiment. Therein, an analog input signal is received and converted to a digital signal in step S810, the digital signal generated in step S810 is received in step S820, and the digital signal is accumulated according to a delay time for generating a carrier signal detection result in step S830.

Regarding the implementing details of the steps, detailed descriptions have been provided in the plurality of embodiments and examples above, and thereby will not be repeated below.

Figure 9:
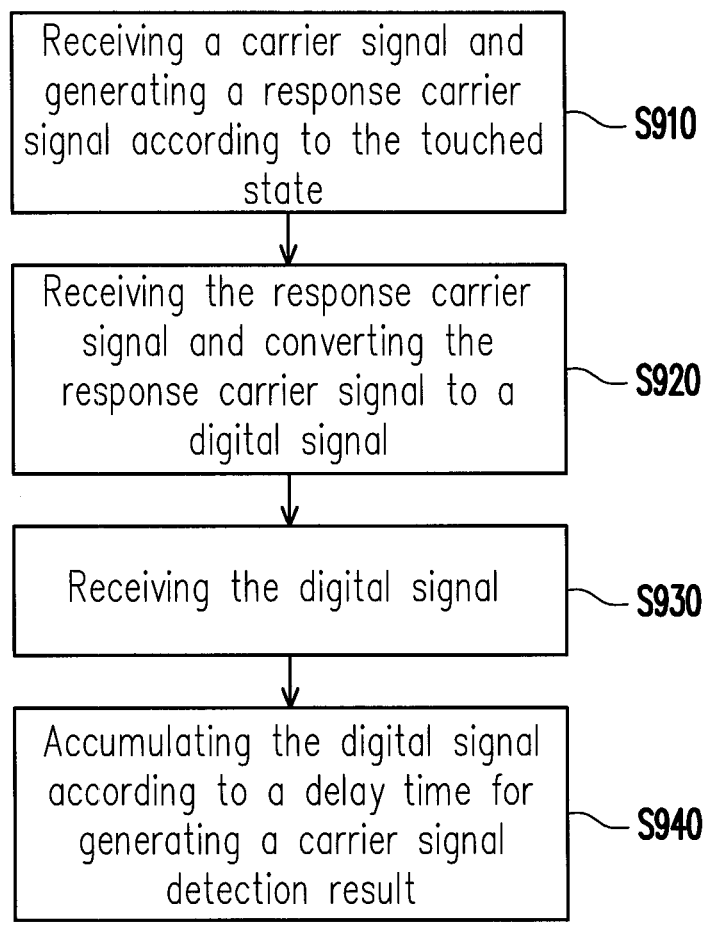
FIG. 9 illustrates a flowchart of a touch control detection method according to an embodiment.

Below referring to FIG. 9, FIG. 9 illustrates a flowchart of a touch control detection method according to an embodiment. In FIG. 9, a carrier signal is received via a touch control detection channel to generate a response carrier signal according to the touched state via the touch control detection channel in step S910. In step S920, a response carrier signal is received and converted to a digital signal, the digital signal generated in step S920 is received in step S930, and the digital signal is accumulated according to a delay time for generating a carrier signal detection result in step S940.

Regarding the implementing details of the steps, detailed descriptions have been provided in the plurality of embodiments and examples above, and thereby will not be repeated below.

In light of the above, the invention realizes the filter in the carrier signal detection apparatus by accumulation. Further, a feature point of the analog input signal is obtained through simple accumulation provided by the filter for obtaining the variation state in the analog input signal that serves as the carrier signal. Thereby, the circuit structure of the filter is largely simplified, and the power consumption thereof is effectively reduced. In addition, the embodiments of the invention may not require the arrangement of the downsampling decimator to effectively reduce the needs for the circuit complexity and the power consumption, and thereby enhance the overall efficiency of the system that the invention is a part of.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A carrier signal detection apparatus, comprising:
    an analog to digital converting (ADC) apparatus, receiving an analog input signal and converting the analog input signal to generate a digital signal, wherein the digital signal equals one of a positive value and a negative value, and the digital signal is a single-bit signal; and
    a filter, coupled to the ADC apparatus to receive the digital signal and accumulate the digital signal according to a delay time for generating a carrier signal detection result, the filter comprises:
        an adder, coupled to the ADC apparatus to receive the digital signal, wherein the adder adds the digital signal and a delayed carrier signal detection result to obtain the carrier signal detection result; and
        a delay unit, coupled to the adder and delays the carrier signal detection result to generate the delayed carrier signal detection result,
    wherein the filter further receives a filtering parameter and accumulates the digital signal according to the filtering parameter and the delay time by weights for obtaining the carrier signal detection result.

2. The carrier signal detection apparatus of claim 1, wherein the filter comprises:
    a multiplier, coupled between the ADC apparatus and adder to receive the digital signal and the filtering parameter, and multiplying the digital signal by the filtering parameter.

3. The carrier signal detection apparatus of claim 1, wherein the digital signal is a multi-bit signal.

4. The carrier signal detection apparatus of claim 1, further comprising:
    at least one decimator, serially connected between the ADC apparatus and the filter to perform downsampling decimation on the digital signal.

5. The carrier signal detection apparatus of claim 1, wherein the ADC apparatus is a delta-sigma ADC apparatus.

6. A touch control detection apparatus, comprising:
at least one touch control detection channel, receiving a carrier signal and generating a response carrier signal according to the touched state; and
a carrier signal detection apparatus, comprising:
an ADC apparatus, receiving the response carrier signal and converting the response carrier signal to generate a digital signal, wherein the digital signal equals one of a positive value and a negative value, and the digital signal is a single-bit signal; and
a filter, coupled to the ADC apparatus to receive the digital signal and accumulate the digital signal according to a delay time for generating a carrier signal detection result, the filter comprises:
an adder, coupled to the ADC apparatus and receiving the digital signal, wherein the adder adds the digital signal and a delayed carrier signal detection result to obtain the carrier signal detection result, wherein the filter further receives a filtering parameter and accumulates the digital signal according to the filtering parameter and the delay time by weights for obtaining the carrier signal detection result; and
a delay unit, coupled to the adder and delays the carrier signal detection result to generate the delayed carrier signal detection result.

7. The touch control detection apparatus of claim 6, wherein the filter comprises:
a multiplier, coupled between the ADC apparatus and the adder to receive the digital signal and the filtering parameter, and multiplying the digital signal and the filtering parameter.

8. The touch control detection apparatus of claim 6, wherein the digital signal is a multi-bit signal.

9. The touch control detection apparatus of claim 6, further comprising:
at least one decimator, serially connected between the ADC apparatus and the filter to perform downsampling decimation on the digital signal.

10. The touch control detection apparatus of claim 6, wherein the ADC apparatus is a delta-sigma ADC apparatus.

11. A carrier signal detection method, comprising:
providing an ADC apparatus to receive an analog input signal and convert the analog input signal to generate a digital signal, wherein the digital signal equals one of a positive value and a negative value;
providing a filter to receive the digital signal; and
providing the filter to accumulate the digital signal according to a delay time for generating a carrier signal detection result, the step thereof comprises:
adding the digital signal and a delayed carrier signal detection result to obtain the carrier signal detection result by the filter; and
delaying the carrier signal detection result by the delay time to obtain the delayed carrier signal detection result by the filter,
wherein the filter further receives a filtering parameter and accumulates the digital signal according to the filtering parameter and the delay time by weights for obtaining the carrier signal detection result.

12. The carrier signal detection method of claim 11, wherein the ADC apparatus is a delta-sigma ADC apparatus.

13. A touch control detection apparatus, comprising:
providing at least one touch control detection channel to receive a carrier signal and generating a response carrier signal according to the touched state via the touch control detection channel;
providing an ADC apparatus to receive the response carrier signal and convert the response carrier signal to generate a digital signal, wherein the digital signal equals one of a positive value and a negative value;
providing a filter to receive the digital signal; and
providing the filter to accumulate the digital signal according to a delay time for generating a carrier signal detection result, the step thereof comprises:
adding the digital signal and a delayed carrier signal detection result to obtain the carrier signal detection result by the filter; and
delaying the carrier signal detection result by the delay time to obtain the delayed carrier signal detection result by the filter,
wherein the filter further receives a filtering parameter and accumulates the digital signal according to the filtering parameter and the delay time by weights for obtaining the carrier signal detection result.

14. The touch control detection apparatus of claim 13, wherein the ADC apparatus is a delta-sigma ADC apparatus.

* * * * *